United States Patent
Nishiyama

(10) Patent No.: US 8,655,818 B2
(45) Date of Patent: Feb. 18, 2014

(54) DISCRIMINATION APPARATUS AND METHOD USING A DECISION TREE

(75) Inventor: Manabu Nishiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 13/010,155

(22) Filed: Jan. 20, 2011

(65) Prior Publication Data

US 2011/0178976 A1 Jul. 21, 2011

(30) Foreign Application Priority Data

Jan. 21, 2010 (JP) .................................. 2010-11425

(51) Int. Cl.
*G06F 17/00* (2006.01)
*G06N 5/00* (2006.01)

(52) U.S. Cl.
USPC ............................................................ 706/45

(58) Field of Classification Search
None
See application file for complete search history.

(56) References Cited

U.S. PATENT DOCUMENTS

2004/0267785 A1* 12/2004 Suontausta et al. ............ 707/100
2011/0153949 A1* 6/2011 Olszewski et al. ............ 711/133

FOREIGN PATENT DOCUMENTS

JP 2002-14816 1/2002

OTHER PUBLICATIONS

Brodal et al. "Cache Oblivious Search Trees via Binary Trees of Small Height", BRICS RS-01-36, pp. 23.*

* cited by examiner

*Primary Examiner* — Li-Wu Chang
(74) *Attorney, Agent, or Firm* — Oblon, Spivak, McClelland, Maier & Neustadt, L.L.P.

(57) ABSTRACT

An apparatus for discrimination includes a memory, an alignment unit configured to align nodes of a decision tree in the memory, wherein a node in which depth from a root node is not greater than a threshold is aligned in accordance with a breadth of first order, and a node in which depth from a root node is greater than a threshold is aligned in accordance with a depth of first order, and a discrimination unit, receiving an inputted data, configured to discriminate a class of the inputted data using the nodes aligned in the memory.

15 Claims, 9 Drawing Sheets

FIG.5
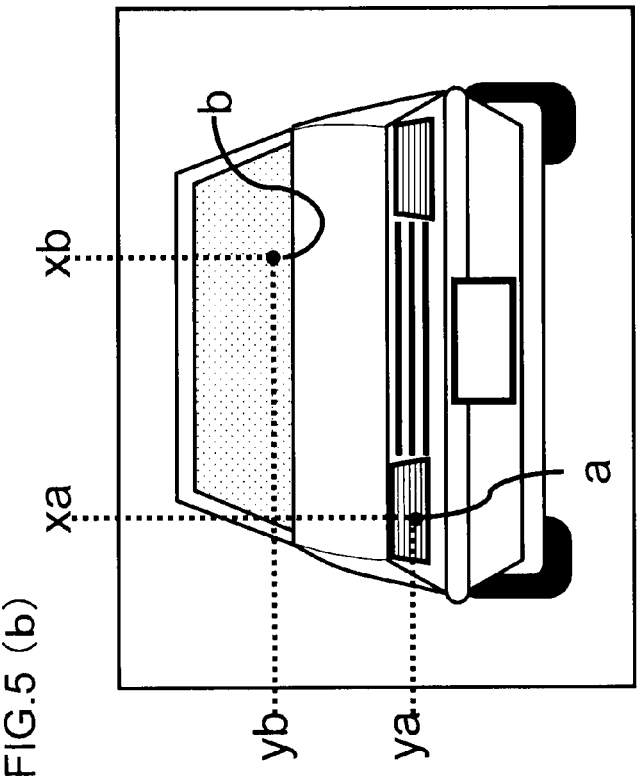
FIG.5 (b)
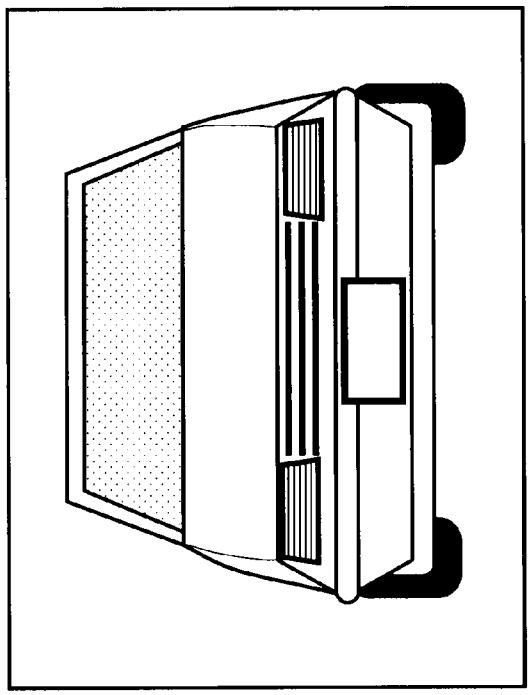
FIG.5 (a)

DISCRIMINATION APPARATUS AND METHOD USING A DECISION TREE

CROSS-REFERENCE TO RELATED APPLICATIONS

This application is based upon and claims the benefit of priority from prior Japanese Patent Application No. 2010-11425, filed Jan. 21, 2010, the entire contents of which are incorporated herein by reference.

FIELD

Embodiments described herein relate generally to a discrimination apparatus and method using a decision tree.

BACKGROUND

A decision tree has been used as one of a classification approach of input data. The decision tree is a decision support tool that uses a tree-like model of decisions and possible consequences, including branch conditions (nodes) which classify input data hierarchically. In these tree structures, leaves represent classifications and branches represent conjunctions of features that lead to those classifications.

It has been suggested as a way of learning the decision tree, that learning samples already given identified classes are classified recursively by using the decision tree to find branch conditions of the decision tree written in a memory. U.S. Pat. No. 7,310,624, for example, has proposed a method of classifying data. In the above-mentioned method, a data inputted into the root node (top node) is moved from a parent node to a child node in accordance with the branch conditions.

In a discriminating process using the decision tree, transitions between nodes occur frequently. Thereby it becomes necessary to access an address where each node is held in the memory, which tends to cause accessing addresses being away from each other. Such memory accesses lead to a decrease in a cache hit ratio and cause slowdowns of processes.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and are not limited to the scope of the invention.

FIG. 5(a) is a view illustrating an example of an image data being inputted;

FIG. 5(b) is a view illustrating an example of coordinates in the image data to be discriminated;

DETAILED DESCRIPTION

In general, according to an embodiment, an apparatus for discrimination includes the following units. A memory. An alignment unit configured to align nodes of a decision tree in the memory, wherein a node in which depth from a root node not greater than a threshold is aligned in accordance with a breadth of first order, and a node in which depth from a root node is greater than a threshold is aligned in accordance with a depth of first order. The discrimination unit, receiving inputted data, is configured to discriminate a class of the inputted data using the nodes aligned in the memory.

Embodiments will be described. In the embodiments, same reference numbers denote same or similar elements, and no duplicate explanation will be made. In the Embodiments described below, an image data is inputted into the apparatus and discriminated into different classes as an example. A kind of data to be discriminated is not limited to image data.

A structure of a decision tree includes represented nodes and leaves extending off from the nodes. Nodes represent branch conditions. Indiscriminating inputted data, the inputted data moves from node to node or node to leaf in accordance with the branch condition of the node. If the inputted data reaches a leaf, the inputted data does not have to move further. The leaf represents a classification result of the node. Examples of branch conditions are described below, as an index of a feature vector, a conditional expression described amount of characteristic, and etc.

Figure 1:
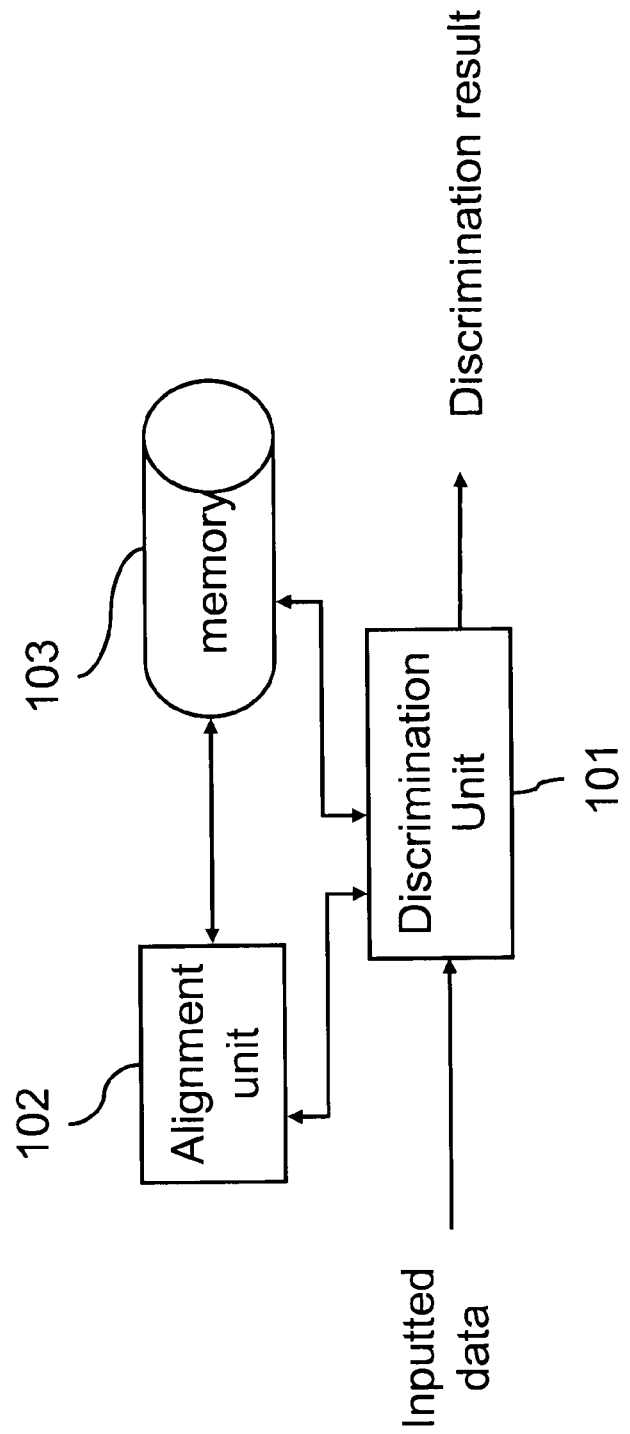
FIG. 1 is a block diagram illustrating a discrimination apparatus, according to a first embodiment.

FIG. 1 shows a block diagram illustrating a discrimination apparatus, according to a first embodiment. The discrimination apparatus includes a discrimination unit 101, an alignment unit 102, and a memory 103.

The discrimination unit 101, receiving an inputted data, discriminates a class to which the inputted data (in this embodiment, the inputted data is image data) belongs, and outputs the class. The decision trees are already held in the discrimination unit 101. The discrimination unit 101 selects a specific decision tree among decision trees, depending on kinds of the inputted data or the class to be discriminated.

The alignment unit 102 decides an alignment order of each node in the decision tree written into the memory 103. The alignment unit 102 writes the decision tree used in discriminating to the memory 103. A node in which depth from a root node is not greater than a threshold is aligned in the memory 103 in accordance with a breadth of first order (defined below). Meanwhile, a node in which depth from a root node is greater than a threshold is aligned in the memory 103 in accordance with a depth of first order (defined below). In the hereinafter, details will be described.

The memory 103 includes a cache memory (not shown) and a main memory (not shown). The nodes of the decision tree are aligned in the memory 103 in accordance with the order determined by the alignment unit 102.

Figure 2:
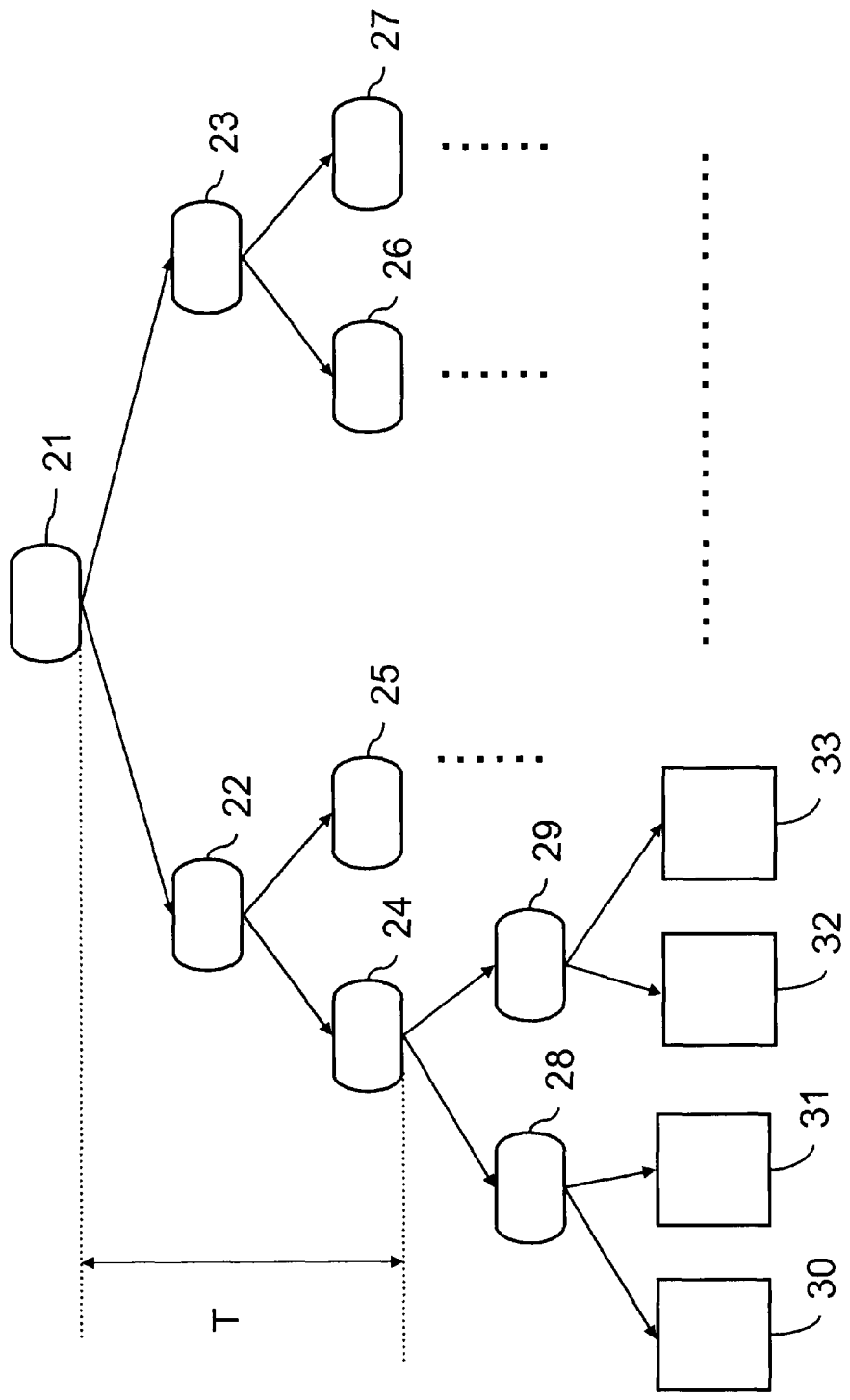
FIG. 2 is a view useful in explaining discrimination processing by using a decision tree.

FIG. 2 shows a view useful in explaining the discrimination process using a decision tree by the discrimination unit 101. The discrimination process starts from a first branch condition written in the root node (the top node) 21. According to the branch conditions in the root node 21, the discrimination unit 101 selects a node 22 or 23 to which to move. If moving to the node 22, the discrimination unit 101 then selects a node 24 or 25 to which to move according to the branch conditions in the node 22. As previously described, the discrimination unit 101 finds the leaf node having no child node after repeatable transitions. Eventually the leaf nodes 30-33 are reached, the leaf nodes 30-33 represent the class belonging to the inputted data. If the depth of the root node is indicated as 0, the depth of the nodes 22 or 23 is indicated as 1, the depth of the nodes 24-27 is indicated as 3, and so on.

Hereinafter how the alignment unit 102 aligns nodes in the decision tree before the discrimination unit 101 performs its discrimination is described.

FIG. 2 illustrates an example in which a specific threshold T is equal to a depth of 2. The alignment unit 102 aligns the nodes 21-27, of which depth from a root node is not greater than the threshold T of 2, in accordance with a breadth of first order in the memory 103 sequentially. Breadth of first order in this case indicates the nodes 22 and 23 neighboring the root node 21 and being of the same hierarchy are explored first, and secondly the nodes 24-27 in a next hierarchical depth below the roots 22 and 23 are explored. That is, those nodes 21-27 within the threshold depth of 2 in this example are aligned based on their hierarchy such that nodes of hierarchy of depth=1 are first aligned, nodes of hierarchy of depth=2 are then aligned, etc. Thereby, nodes of a same hierarchy are consecutively aligned, and nodes of a higher hierarchy are aligned prior to nodes of a lower hierarchy. The alignment unit 102 further aligns the nodes in which depth from a root node is greater than the threshold T of 2 in accordance with a depth of first order in the memory 103 sequentially. Depth of first order indicates in this example that the node 28 is explored at first. Sequentially, nodes are explored in deeper depths to reach the node 30 (the leaf) having no child node. Subsequently, the alignment unit 102 backtracks to the node 31 having not been explored and being the nearest next node. That is, in depth of first order, nodes 28-33 beyond the threshold depth of 2 in this example are not aligned based on hierarchy or breadth, but instead based on movements from nodes in a depth direction, and then backtracking up to a node. That is, consecutive nodes in a depth direction of the decision tree are consecutively aligned.

Figure 3:
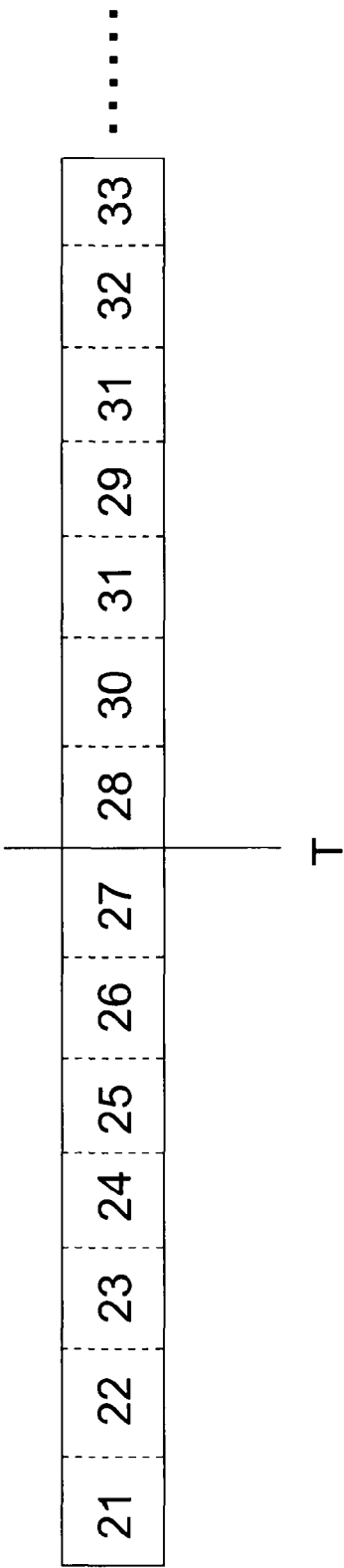
FIG. 3 is a view illustrating a layout of nodes for example.

FIG. 3 shows a view illustrating a layout of nodes aligned by the alignment unit 102 in the decision tree shown in FIG. 2. In FIG. 3 the nodes in which depth from a root node is not greater than 2 (nodes 21-27) are aligned in the memory 103 in accordance with the breadth of first order. In FIG. 3 the nodes in which depth from a root node is greater than the threshold T of 2 (nodes 28-33) are aligned in the memory 103 in accordance with the depth of first order. The depth or breadth of first order still allows a change of order in the range of a same hierarchy level. For example, either of node 22 or node 23 being in the same hierarchy in the breadth of first order could be aligned alternatively. Likewise, either of node 28 or node 29 being in the same hierarchy in the depth of first order could be aligned alternatively. The alignment of the nodes described above improves a cache hit ratio when the discrimination unit 101 accesses the memory 103, because the discrimination unit 101 can access nodes being neighboring in address continuously.

The operation of the discrimination apparatus of the first embodiment is described below. As an example, the discrimination apparatus can discriminate whether the inputted image data includes a vehicle using the decision tree. The decision tree exemplified below classifies the image data into two classes (vehicle class or non-vehicle class). The number of the classes is just a example, and is not limited to two classes.

FIG. 5(a) shows a view illustrating an image data being inputted. FIG. 5(b) shows a view illustrating coordinates in the image data to be discriminated. For example, the discrimination unit 101 discriminates the class of the image data using luminance in the image data. Each node specifies the coordinate points a (xa, ya) and b (xb, yb) in the image data. The discrimination unit 101 compares luminance of a (xa, ya) and b (xb, yb) and selects nodes to be moved to in accordance with the comparison result. The movement through nodes is continually performed, until the image data reaches the leaf node representing the class.

Figure 6:
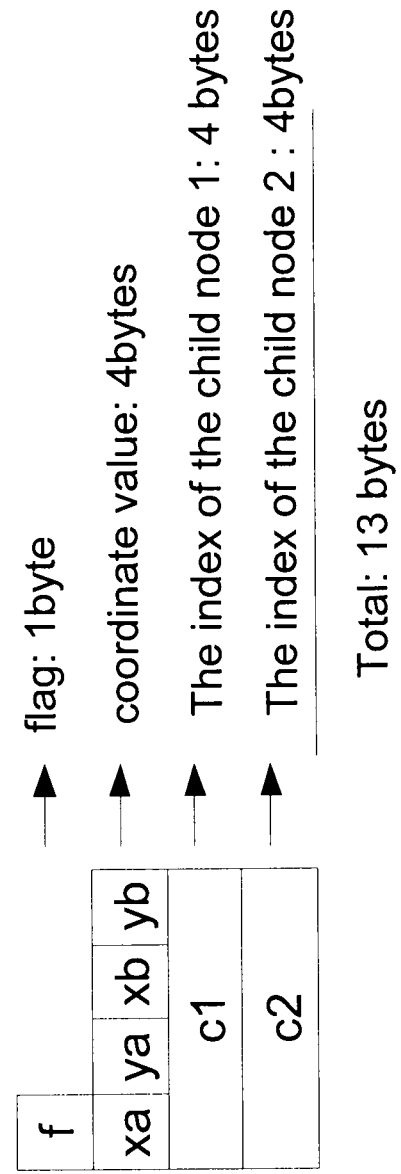
FIG. 6 is a view illustrating an example of a nonterminal node.

FIG. 6 shows a view illustrating a data structure of the nonterminal node. In FIG. 6, the nonterminal node includes a flag f which represents the node is the nonterminal node, the coordinate points a and b to be compared, c1 indicating an index of a child node to be moved to if the luminance of point a is the larger luminance, and c2 indicating an index of a child node to be moved to if luminance of point b is the larger luminance. The data of the nonterminal node needs 13 bytes. Of the total, 1 byte is the flag f, 1 byte is each coordinate value (total of 4 bytes), 4 bytes are each index of the child node (total of 8 bytes).

Figure 7:
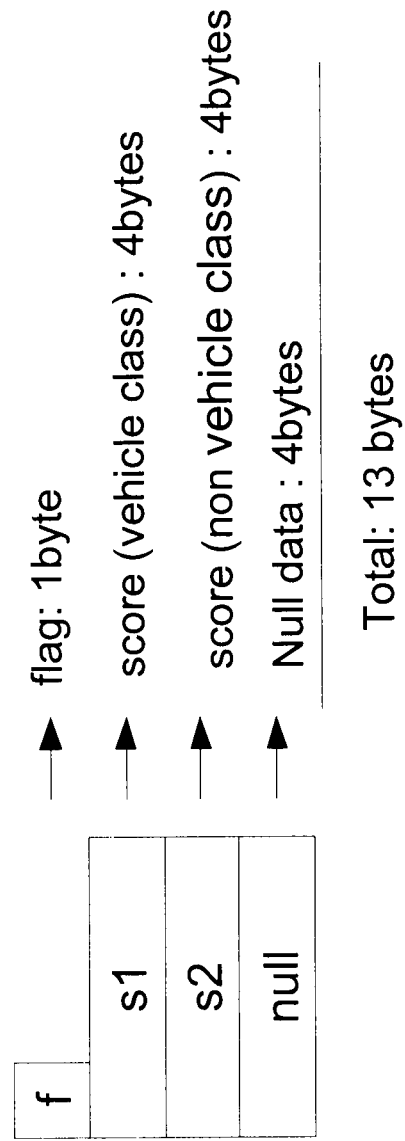
FIG. 7 is a view illustrating an example of an end node.

FIG. 7 shows a view illustrating a data structure of the end node (the leaf node). In FIG. 7, the end node includes a flag f which represents the node is the end node, s1 indicating a probability score that the inputted data that has reached the end node includes a vehicle (for this example), and s2 indicating a probability score that the inputted data that has reached the end node does not include a vehicle. The data of the end node needs 9 bytes, of the total 1 byte is the flag f, 4 bytes is s1, and 4 bytes is s2. The probability s1 and s2 each needs 4 bytes so as to represent the number of decimal places. Although 9 bytes is enough to represent the end node indeed, the end node includes an extra null data of 4 bytes to even out any discrepancy in the data amount between the end node and the nonterminal node for simplicity to manipulate data stored in memory. Hereinafter, the end node and the nonterminal node are described as "the node data" generally. As an example, the decision tree is a binary partition tree, in which the nonterminal node has two child nodes. However that is just an example, so the structure of the decision tree is not limited to a binary partition tree. To discriminate class of the inputted data using the decision tree, branch conditions of the nodes have to be determined previously. These processes are generally called decision tree learning or generating. Various known ways of generating or having a decision tree can be implemented, and thereby the embodiments give no details in how to learn or generate the decision tree.

Figure 4:
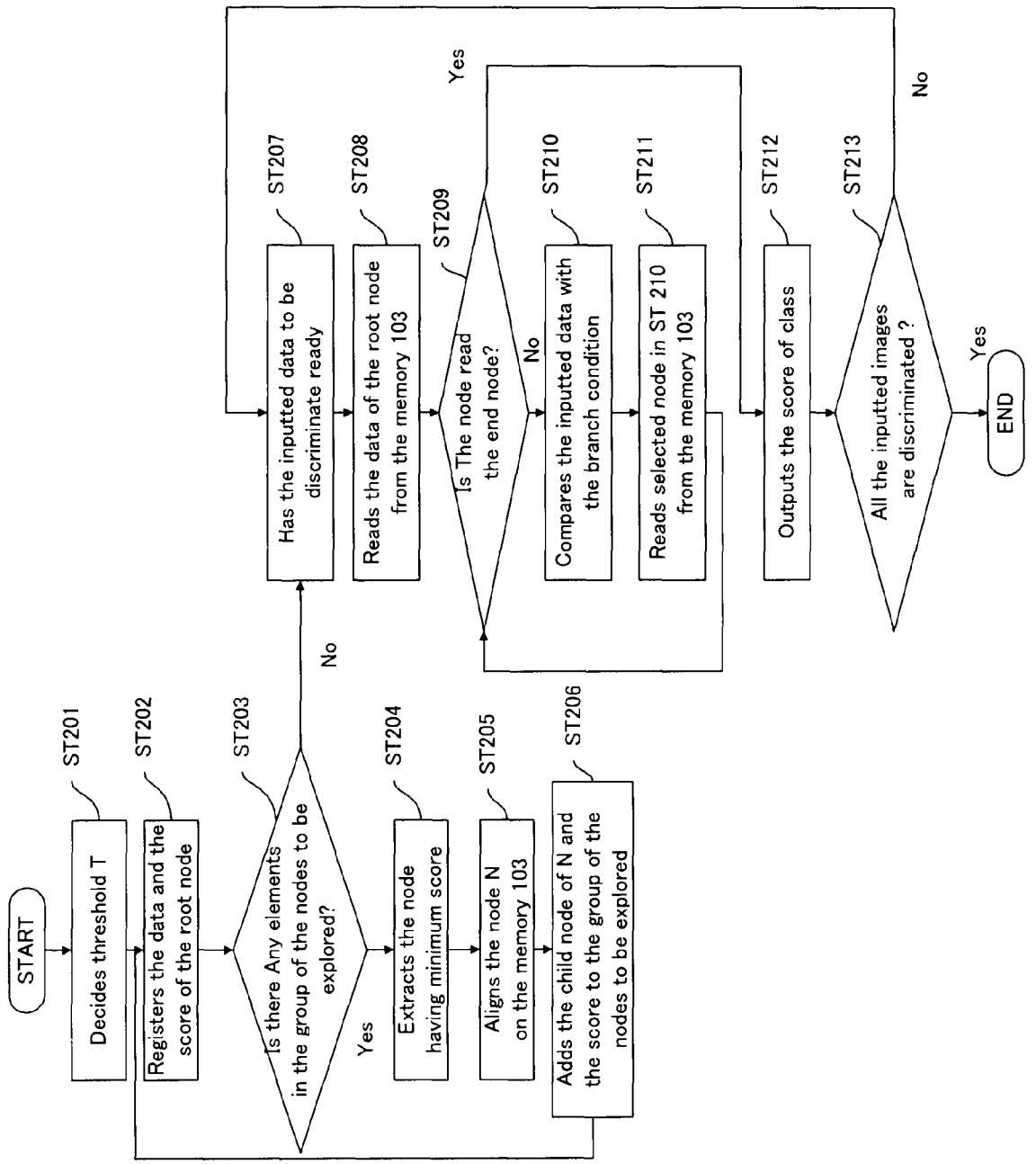
FIG. 4 is a flow chart illustrating the discrimination method used for the first embodiment and a second embodiment.

FIG. 4 is a flow chart illustrating the discrimination method used for the first embodiment and a second embodiment. The alignment unit 102 executes operations described in ST 201~ST 206. The discrimination unit 101 executes operations described in ST 207~ST 213. Meanwhile, operations performed by the discrimination unit 101 could be previously performed in a decision tree learning. The result in a decision tree learning could be stored in the memory 103 (or in an external storage). Alternatively, operations performed by the discrimination unit 101 could be performed when the discrimination unit 101 writes the decision tree into the memory 103 (or into an external storage). The latter needs more processing load than the former when the discrimination unit 101 reads the decision tree from the memory 103 (or from an external storage). However, the latter can align the nodes in the memory 103 to make the most efficient use of available memory (especially cache memory in the memory 103). Which option to choose can be decided depending on the specification of the discrimination apparatus.

The alignment unit 102 decides threshold T switching transition of nodes (ST201). T is decided voluntarily, and for example is a specific constant or a value given by the following equation (1). Cs indicates line size of the cache memory on the processor (a size of the data unit being held in the cache memory), and Ns indicates a size of each node in the equation (1). In this embodiment, Ns is 13 bytes.

$$N_s \times 2^{T+1} < C_s \quad (1)$$

If the specification of the processor (the discrimination apparatus) is already known, steps ST 201~206 can be executed in decision tree learning. On the other hand, if the specification of the processor is not known in decision tree learning, or the specification of the cache memory is varied in memory, steps ST 201~ST 206 can be executed when the discrimination unit 101 discriminates to make the most efficient use of available memory. The node in which depth from a root node is not greater than a threshold (T) is aligned in the memory 103 in accordance with the breadth of first order. The node in which depth from a root node is greater than a threshold (T) is aligned in the memory 103 in accordance with the depth of first order.

The alignment unit 102 registers the data and the score of the root node (the top node) in a group of the nodes to be moved to (ST202). The score can be provided by two different methods depending on the depth of the node. If the depth of the node n is not larger than T, the score f(n) of n is given by the following equation (2).

$$f(n) = \text{depth}(n) + 0.9(d_{max} - \text{depth}(n)) \quad (2)$$

If the depth of the node n is larger than T, f(n) is given by the following equation (3).

$$f(n) = \text{depth}(n) + 1.1(d_{max} - \text{depth}(n)) \quad (3)$$

In the equations (2), (3) depth(n) indicates depth of the node n, and Dmax indicates maximum depth in the decision tree.

In decision tree learning, the maximum depth in the decision tree is set as a censoring condition previously. Or Dmax can be set to be a larger value than the maximum depth in the decision tree. The calculated scores of the root nodes are added to the group of the nodes to be explored. The group of the nodes to be explored leads to optimize the alignment of the nodes in the memory 103 during decision tree learning. If steps ST 201~ST 206 are executed in decision tree learning, ST 202 is executed at the stage of the branch conditions of the nodes decided. If steps ST 201~ST 206 are executed at the stage of reading from the memory 103, the data of the nodes are read from storage (not shown in the figure) in adding the node to the group of the nodes to be explored.

The alignment unit 102 determines whether there are any elements in the group of the nodes to be explored (ST 203). If all the nodes in the decision tree are aligned in the memory 103, the group of the nodes includes none of nodes. If ST 203 is NO, the operation goes to ST 207. If ST 203 is YES, the operation goes back to ST 204.

The alignment unit 102 extracts the node having the minimum score in the group of the nodes to be explored (ST 204). The method to calculate score can be switched depending on the depth of the node. In ST 2014, the node in which depth from a root node is not greater than a threshold (T) is extracted with the breadth of first order. Meanwhile, the node in which depth from a root node is greater than a threshold (T) is extracted in accordance with the depth of first order. The extracted node is described as N.

The alignment unit 102 aligns the node N in the memory 103 (ST 205). The extracted node N is aligned next to the node most recently aligned. In the memory 103, the data of the nodes are aligned in accordance with the order extracted in the ST 204.

The alignment unit adds the child node of the extracted node N and the score provided by the equations (2) and (3) to the group of the nodes to be explored (ST 206).

In the operation described above, the alignment of the nodes is already optimized.

The discrimination unit 101 executes operations described steps ST 207~ST 213.

The discrimination unit 101 has the inputted data to be discriminated ready (ST 207). ST 207 depends on the target to be discriminated. Generally, the discrimination unit 101 calculates the feature vector in the inputted data. In this embodiment, the discrimination unit 101 discriminates whether the inputted image data includes a vehicle using the decision tree. To classify the image data into two classes (vehicle class or non-vehicle class), the discrimination unit 101 clips part of the image data, and a size of the clipped part is normalized. And the discrimination unit 101 discriminates whether the clipped part includes a vehicle or not in the following steps ST 208~ST 212.

The discrimination unit 101 reads the data of the root node on the memory 103 to classify the inputted data (ST 208). In fact, the discrimination unit 101 reads leading data of the nodes at first.

The discrimination unit 101 determines whether the node read is the end node or not (ST 209). In this embodiment, the decision tree includes the 1-byte flag indicating the end node or not. If the node read is the end node, YES in ST 209, the operation goes to ST 212. If the node read is not the end node, NO in ST 209, the operation goes to ST 212.

The discrimination unit 101 reads the branch condition of the nonterminal node and compares the inputted data with the branch condition (ST 210), and the discrimination unit 101 selects the node to be moved to next from among the child nodes. In the decision tree according to this embodiment, coordinates a and b and the two indexes of the child nodes if luminance of a is larger than that of b, or not, are written as a branch condition. Therefore, the discrimination unit 101 extracts luminance of a and b in the image data, compares luminance of a and b, and makes a choice between two child nodes.

The discrimination unit 101 reads the selected node in ST 210 from the memory 103 (ST 211). After reading, the discrimination unit 101 backtracks to ST 209.

If reaching the end node, the operation goes to ST 212. The discrimination unit 101 outputs the score of the class written in the data of the end node as the discrimination result (ST 212). In this example of the embodiment, the leaf nodes hold each score of vehicle or non-vehicle, so the discrimination unit 101 outputs these scores. According to the description above, the discrimination apparatus outputs the score indicating whether the inputted image includes a vehicle or not. In the discrimination using the decision tree, the discrimination result whether the inputted image includes a vehicle or not is based on how large the score is. Alternatively, the discrimination apparatus could discriminate using a plurality of the decision trees. If using plural decision trees, the discrimination unit 101 sums up each score outputted by each of the decision trees and discriminates whether the inputted image includes a vehicle or not in accordance with the total score.

The discrimination unit 101 determines whether all the inputted images are discriminated (ST 213). If the inputted data to be discriminated is image data, generally a discrimination process is executed for each area clipped from one or some of frames of an image. If ST 213 is YES, the operation goes back to ST 207. If ST 213 is NO, the discrimination process is ended.

The steps described above allow for more efficient discriminating using the decision tree with a view to improving alignment of nodes in the memory 103. If the nodes are aligned in accordance with the depth of first order, one of the child nodes is aligned next to the parent node in the memory 103. Another child node may be aligned far from the parent node in the memory 103. Being a binary partition tree, a neighboring node is selected as a node to be moved to at 50%, even if nodes are close to the end node. Thereby, a hit ratio on the cache memory is high. Combining the two methods (the breadth of first order and the depth of first order) to align nodes in the memory 103 makes it possible to keep the ratio that the child node is held in the cache memory above a certain level. That improves the cache ratio in moving from node to node, and improves processing speed of discrimination. The changes in alignment of nodes may not effect accuracy of discrimination. Another advantage is that the threshold T is scaleable depending on the specification of the processor.

The discrimination apparatus according to another embodiment switches alignment of nodes between the breadth of first order or the depth of first order based on a transition probability. If aligning nodes in accordance with the breadth of first order, a distance from a parent node to each child nodes in the memory 103 is nearly equal. Although as the depth from the root node increases, a distance from a parent node to each child nodes in the memory 103 gets exponentially larger. Memory access to nodes being on distantly-positioned addresses from each other needs more time to read in the memory 103, because these nodes are not written in the cache memory yet. If all the nodes of the decision tree are aligned in accordance with the breadth of first order, as the distance from the root node increases, the hitting ratio in the cache memory decreases exponentially. So in this embodiment, the node in which depth from a root node is not greater than a threshold (T) is aligned in the memory 103 in accordance with the breadth of first order. Meanwhile, the node in which depth from a root node is greater than a threshold (T) is aligned in the memory 103 in accordance with the depth of first order.

Figure 8:
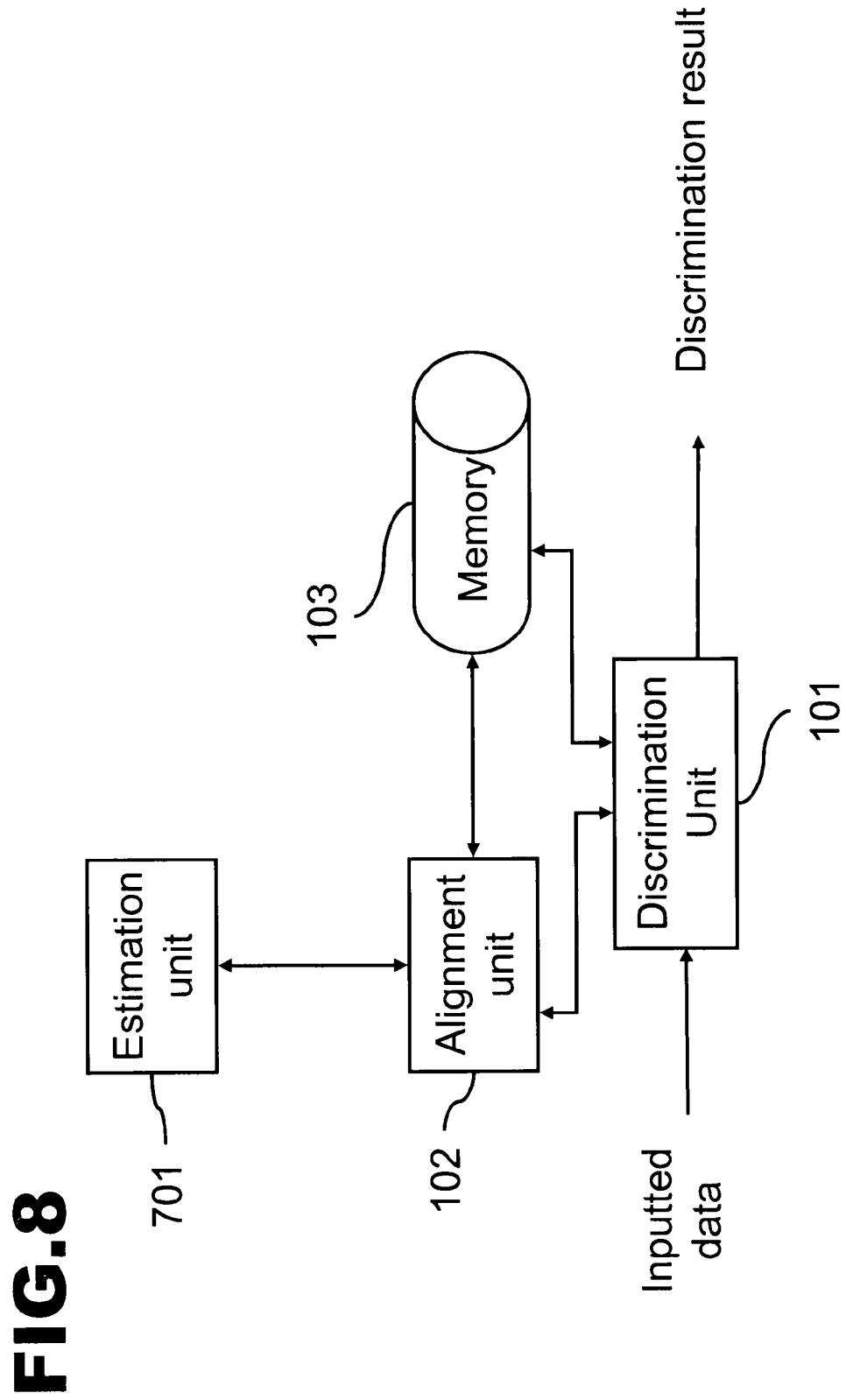
FIG. 8 is a block diagram illustrating a discrimination apparatus, according to the second embodiment and a third embodiment.

FIG. 8 shows a block diagram illustrating a discrimination apparatus, according to a second embodiment. The discrimination apparatus according to the second embodiment further includes an estimation unit 701. The estimation unit 701 estimates a probability to move from a parent node to a child node respectively. Basically, a flow chart of the discrimination apparatuses according to the second embodiment is illustrated in FIG. 4. However, some operations performed by the estimation unit 701 differ. The differences are described below.

In this embodiment, the method of calculating a score of the node at ST 202 and ST 206 is different from the first embodiment. In this embodiment, the score of each node is calculated coupled with a probability of movement to its child nodes. The score of the node is given by following equations (4) and (5). If the depth of the node n is not larger than T, the score f(n) of n is given by the following equation (4). If the depth of the node n is larger than T, f(n) is given by the following equation (5).

$$f(n)=\text{depth}(n)+(1-\text{prob}(n))+0.9(d_{max}-\text{depth}(n)) \quad (4)$$

$$f(n)=\text{depth}(n)+(1-\text{prob}(n))+1.1(d_{max}-\text{depth}(n)) \quad (5)$$

In equations (4) and (5) prob(n) indicates the transition probability between the parent node of the node n and the node n. It may be hard to calculate the transition probability of all data to be inputted completely, so an approximation of the transition probability prob(n) is used.

If alignment of nodes is improved in decision tree learning, the estimation unit 701 estimates the probability by a ratio of moved samples in decision tree learning.

The approximate value is given in the following equation (6). Np indicates an amount of the learning samples reaching the parent node of the node n, and Nc indicates an amount of the learning samples reaching the node n. If n is the root node having no parent node, prob(n) is defined to be 1.

$$prob(n) = \frac{N_c}{N_p} \quad (6)$$

If the alignment of nodes is improved in discrimination processing, prob(n) is given as the number of samples reaching each node which is saved in decision tree learning. The number of the inputted data reaching each node could be added to the learning samples reaching each node to further improve the approximate accuracy of prob(n). Np indicates an amount of the learning samples reaching the parent node of the node n, and Nc indicates the learning samples reaching the node n, Np' indicates an amount of the inputted data reaching the parent node of the node n, Nc' indicates amount of the inputted data reaching the node n. prob (n) is given by following equation (7).

$$prob(n) = \frac{N_c + N_c'}{N_p + N_p'} \quad (7)$$

Np' and Nc' are held in the discrimination process, and saved at the end of the process. In this way, a sample number used in estimation of prob(n) increases with each discrimination process, and approximate accuracy of prob(n) is further improved.

The alignment unit uses prob(n) in score calculating. Scores are different between nodes whose parent node is the same. A node having a higher transition probability has a lower score among nodes whose parent node is the same. A node having a lower score is aligned anteriorly. Especially it affects a node aligned in accordance with the depth of first order effectively. If nodes are aligned in accordance with depth of first order, one of the child node c1 is the back of the parent node p. So the distance between p and c1 is the minimum. On the other hand, the next child node c2 of p is aligned the back of all the child nodes of c1, and thereby the distance between p and c2 can be far. That means that if nodes are aligned in accordance with depth of first order and c1 is a node to be moved to, the processor hits the cache memory. In this embodiment, a node having the highest probability of transition is assigned c1 to improve the cache memory hit ratio.

The basic configuration of a discrimination apparatus according to a third embodiment is similar to that of the second embodiment. The apparatus according to this embodiment includes the discrimination unit 101, the alignment unit 102, the memory 103, and the estimation unit 701.

Figure 9:
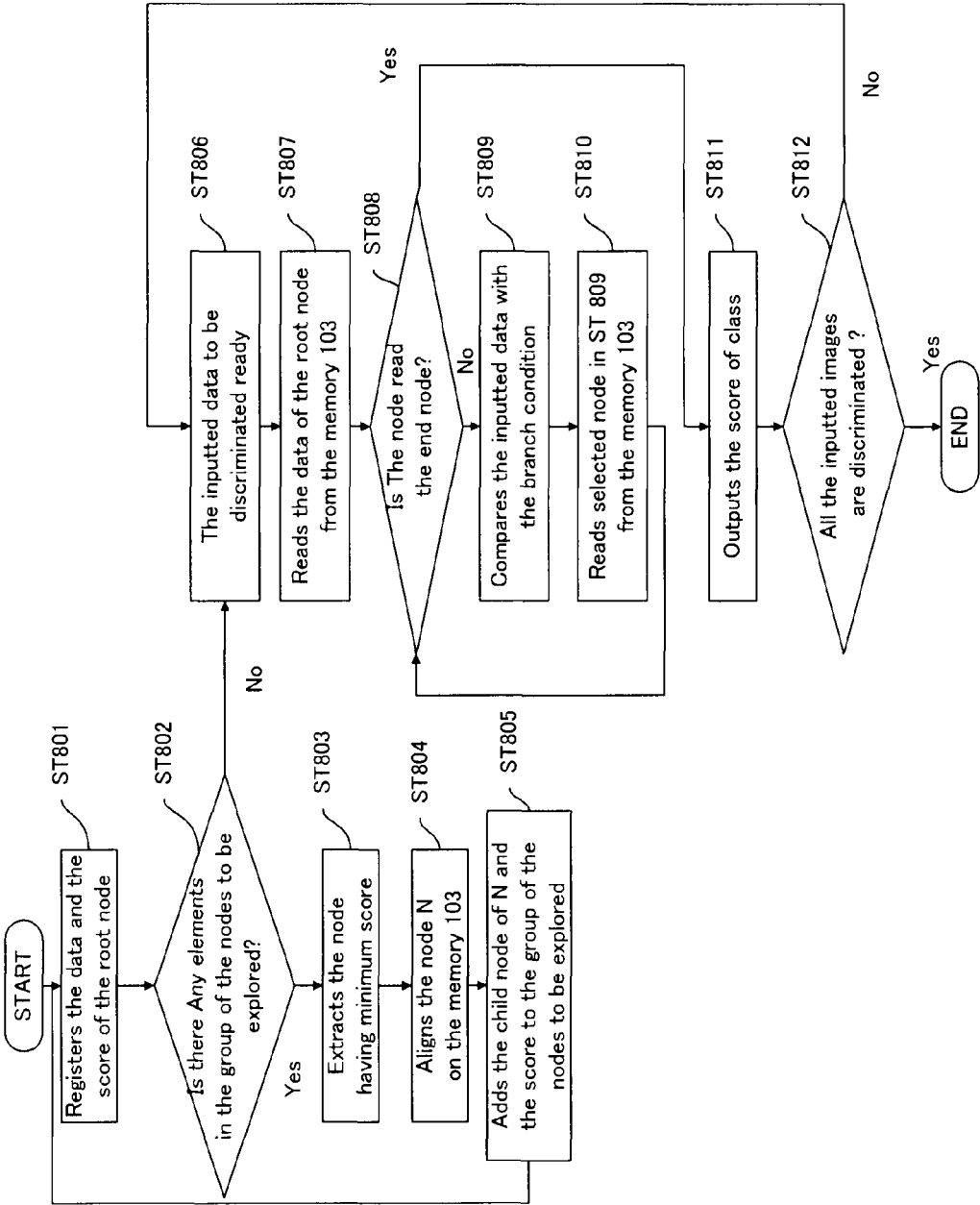
FIG. 9 is a flow chart illustrating the discrimination apparatuses, according to the third embodiment.

FIG. 9 shows a flow chart illustrating the discrimination apparatuses, according to the third embodiment. The operation described in FIG. 9 is different from the operation described in FIG. 4 only in not determining the threshold T. The operation described in FIG. 9 does not include the step S201 of determining the threshold T. Otherwise, the operation in FIG. 9 corresponds to the operation in FIG. 4, and therefore that explanation is not repeated. In the ST 801 and ST 805, the score of nodes are given by the following equation (8).

$$f(n)=\text{depth}(n)+(1-\text{prob}(n))+1.1(d_{max}-\text{depth}(n)) \quad (8)$$

The alignment unit 102 does not switch the methods of alignment of nodes. The alignment unit 102 aligns nodes in accordance with a score estimated by estimation unit 701. As described in the second embodiment, a node having higher probability of transition is aligned in the front.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A discrimination apparatus comprising:
   a memory;
   an alignment unit configured to align nodes of a decision tree in the memory, wherein a node in which depth from a root node is not greater than a threshold is aligned in accordance with a breadth of first order, and a node in which depth from a root node is greater than a threshold is aligned in accordance with a depth of first order; and
   a discrimination unit, receiving an inputted data, configured to discriminate a class of the inputted data using the nodes aligned in the memory;
   wherein the memory comprises a cache memory configured to hold at least part of the decision tree; and
   wherein the alignment unit decides the threshold based on an available memory of the cache memory, and decides the threshold so that a total data size of the nodes is less than the available memory of the cache memory.

2. The apparatus according to claim 1, wherein the alignment unit aligns the nodes in the memory before the discrimination unit discriminates the class of the inputted data.

3. The apparatus according to claim 1, further comprising an estimation unit configured to estimate a probability to move from a parent node to child node respectively, wherein the alignment unit aligns child nodes whose parent node is the same in a decreasing order of the probability.

4. The apparatus according to claim 3, wherein the estimation unit calculates the probability based on a number of formerly discriminated data reaching each node.

5. The apparatus according to claim 3, wherein the estimation unit calculates the probability based on a number of a learning sample of formerly discriminated data reaching each node.

6. A discrimination method comprising:
   receiving an inputted data;
   aligning, by an alignment unit, nodes of a decision tree in a memory, wherein a node in which depth from a root node is not greater than a threshold is aligned in accordance with a breadth of first order, and a node in which depth from a root node is greater than a threshold is aligned in accordance with a depth of first order; and
   discriminating a class of the inputted data using the nodes aligned in the memory;
   wherein the memory comprises a cache memory configured to hold at least part of the decision tree, the method further comprising:
   deciding in the alignment unit, the threshold based on an available memory of the cache memory, and deciding the threshold so that a total data size of the nodes is less than the available memory of the cache memory.

7. The method according to claim 6, wherein the aligning, in the alignment unit, aligns the nodes in the memory before the discriminate unit discriminates the class of the inputted data.

8. The method according to claim 6, further comprising estimating a probability to move from a parent node to child node respectively, wherein the aligning, in the alignment unit, aligns child nodes whose parent node is the same in a decreasing order of the probability.

9. The method according to claim 8, wherein the estimating calculates the probability based on a number of formerly discriminated data reaching each node.

10. The method according to claim 8, wherein the estimating calculates the probability based on a number of a learning sample of formerly discriminated data reaching each node.

11. A discrimination apparatus comprising:
    a memory;
    means for aligning nodes of a decision tree in the memory, wherein a node in which depth from a root node is not greater than a threshold is aligned in accordance with a breadth of first order, and a node in which depth from a root node is greater than a threshold is aligned in accordance with a depth of first order; and
    means for receiving an inputted data, and for discriminating a class of the inputted data using the nodes aligned in the memory;
    wherein the memory comprises a cache memory configured to hold at least part of the decision tree;
    and the means for aligning decides the threshold based on an available memory of the cache memory, and decides the threshold so that a total data size of the nodes is less than the available memory of the cache memory.

12. The apparatus according to claim 11, wherein the means for aligning aligns the nodes in the memory before the discriminate unit discriminates the class of the inputted data.

13. The apparatus according to claim 11, further comprising means for estimating a probability to move from a parent node to child node respectively, wherein the means for aligning aligns child nodes whose parent node is the same in a decreasing order of the probability.

14. The apparatus according to claim 13, wherein the means for estimating calculates the probability based on a number of formerly discriminated data reaching each node.

15. The apparatus according to claim 13, wherein the means for estimating calculates the probability based on a number of a learning sample of formerly discriminated data reaching each node.

* * * * *